United States Patent
Gifford

(10) Patent No.: US 10,528,772 B1
(45) Date of Patent: Jan. 7, 2020

(54) ASSISTED AIMER FOR OPTIMIZED SYMBOL SCANNING BY A PORTABLE COMPUTING DEVICE HAVING AN INTEGRAL CAMERA

(71) Applicant: SOCKET MOBILE, INC., Newark, CA (US)

(72) Inventor: Micheal L. Gifford, San Leandro, CA (US)

(73) Assignee: Socket Mobile, Inc., Newark, CA (US)

(*) Notice: Subject to any disclaimer, the term of this patent is extended or adjusted under 35 U.S.C. 154(b) by 0 days.

(21) Appl. No.: 13/775,249

(22) Filed: Feb. 24, 2013

Related U.S. Application Data

(60) Provisional application No. 61/603,228, filed on Feb. 24, 2012.

(51) Int. Cl.
*G06K 19/00* (2006.01)
*G06K 7/015* (2006.01)
*G06K 7/10* (2006.01)

(52) U.S. Cl.
CPC ......... *G06K 7/015* (2013.01); *G06K 7/10881* (2013.01)

(58) Field of Classification Search
USPC ........................................................ 235/462
See application file for complete search history.

(56) References Cited

U.S. PATENT DOCUMENTS

| | | |
|---|---|---|
| 4,766,299 A | 8/1988 | Tierney et al. |
| 5,019,699 A | 5/1991 | Koenck |
| 5,191,411 A | 3/1993 | Muckerheide |
| 5,288,984 A | 2/1994 | Ito et al. |
| 5,296,689 A | 3/1994 | Reddersen et al. |
| 5,331,176 A | 7/1994 | Sant Anselmo et al. |
| 5,378,883 A | 1/1995 | Batterman et al. |
| 5,598,007 A | 1/1997 | Bunce et al. |

(Continued)

FOREIGN PATENT DOCUMENTS

| | | |
|---|---|---|
| JP | 2004032507 A | 1/2004 |
| JP | 2004080147 A | 3/2004 |
| WO | WO-2012082738 A1 | 6/2012 |

OTHER PUBLICATIONS

"Microsoft Press Computer Dictionary: the Comprehensive Standard for Business, School, Library and Home", Microsoft Press 2nd ed., Copyright 1994, 7 pages (front, copyright page, pp. 23, 24, 182, 190, and 310).

(Continued)

*Primary Examiner* — Matthew Mikels
(74) *Attorney, Agent, or Firm* — Wilson Sonsini Goodrich & Rosati

(57) ABSTRACT

An assisted aimer for rapid, accurate, and low-cost imaging of barcodes, includes a hand-held device, such as a smart phone or tablet, having a digital camera with built-in flash, a specialized software application executing on the phone, and an aimer apparatus attached in front of the flash aperture for forming an aimer beam at a predetermined distance. The aimer beam assists a user in accurately pointing the device at a target barcode. The aimer is attachable directly to the smart phone or camera, or is made a part of an enclosure that accepts the smart phone or tablet into a self-aligning receiving space. Aiming beam assistance enables the camera, its auto-focus, and the installed software application image processing to deliver rapid, snappy, barcode imaging.

20 Claims, 3 Drawing Sheets

(56) References Cited

U.S. PATENT DOCUMENTS

| | | |
|---|---|---|
| 5,600,116 A | 2/1997 | Seo et al. |
| 6,060,722 A | 5/2000 | Havens et al. |
| 6,123,263 A | 9/2000 | Feng |
| 6,223,986 B1 | 5/2001 | Bobba et al. |
| 6,294,775 B1 | 9/2001 | Seibel et al. |
| 6,429,934 B1 | 8/2002 | Dunn et al. |
| 6,561,428 B2 | 5/2003 | Meier et al. |
| 6,798,401 B2 | 9/2004 | DuFaux |
| 6,840,627 B2 | 1/2005 | Olbrich |
| 6,866,198 B2 | 3/2005 | Patel et al. |
| 6,877,664 B1 | 4/2005 | Oliva |
| 6,970,600 B2 | 11/2005 | Abe |
| 6,997,385 B2 | 2/2006 | Palestini et al. |
| 7,090,137 B1 | 8/2006 | Bennett |
| 7,163,150 B2 | 1/2007 | Kricorissian et al. |
| 7,240,842 B2 | 7/2007 | Hara et al. |
| 7,392,951 B2 | 7/2008 | Ray et al. |
| 7,612,997 B1 | 11/2009 | Diebel et al. |
| 7,699,227 B2 | 4/2010 | Wang et al. |
| 7,772,533 B2 | 8/2010 | Brock et al. |
| 8,695,880 B2 | 4/2014 | Bremer et al. |
| 8,749,970 B2 | 6/2014 | Petersson et al. |
| D716,285 S | 10/2014 | Chaney et al. |
| 9,019,420 B2 | 4/2015 | Hurst et al. |
| 9,232,036 B2 | 1/2016 | Mase |
| 9,262,660 B2 | 2/2016 | Lu et al. |
| 9,304,376 B2 | 4/2016 | Anderson |
| 9,747,482 B2 | 8/2017 | Gifford et al. |
| 9,811,702 B2 | 11/2017 | Gifford et al. |
| 9,990,523 B2 | 6/2018 | Gifford et al. |
| 9,990,526 B2 | 6/2018 | Gifford et al. |
| 10,075,572 B2 | 9/2018 | Gifford et al. |
| 2001/0041073 A1 | 11/2001 | Sorek et al. |
| 2003/0222150 A1 | 12/2003 | Sato et al. |
| 2005/0247787 A1 | 11/2005 | Von Mueller et al. |
| 2005/0279832 A1 | 12/2005 | Kobayashi et al. |
| 2006/0033884 A1 | 2/2006 | Sato |
| 2006/0043191 A1 | 3/2006 | Patel et al. |
| 2006/0118635 A1* | 6/2006 | Joseph ............... G02B 7/08 235/462.24 |
| 2006/0131419 A1 | 6/2006 | Nunnink |
| 2006/0274171 A1 | 12/2006 | Wang |
| 2006/0284987 A1 | 12/2006 | Wolf, II |
| 2007/0063050 A1* | 3/2007 | Attia et al. ............ 235/462.46 |
| 2007/0084924 A1* | 4/2007 | Watanabe et al. ............ 235/451 |
| 2007/0108283 A1 | 5/2007 | Thuries |
| 2007/0108286 A1 | 5/2007 | Patel |
| 2007/0176003 A1 | 8/2007 | Brock |
| 2007/0181692 A1 | 8/2007 | Barkan et al. |
| 2007/0280677 A1 | 12/2007 | Drake et al. |
| 2008/0006699 A1 | 1/2008 | Hattersley et al. |
| 2008/0017717 A1 | 1/2008 | Miyazaki et al. |
| 2009/0044003 A1* | 2/2009 | Berthiaume et al. ......... 713/100 |
| 2009/0087722 A1 | 4/2009 | Sakabe et al. |
| 2009/0090782 A1* | 4/2009 | May ........................ 235/462.21 |
| 2010/0124040 A1 | 5/2010 | Diebel et al. |
| 2010/0147956 A1 | 6/2010 | Wang et al. |
| 2010/0328420 A1 | 12/2010 | Roman |
| 2011/0096181 A1 | 4/2011 | Carlson et al. |
| 2011/0192967 A1 | 8/2011 | Kvasha et al. |
| 2011/0309728 A1 | 12/2011 | Diebel |
| 2012/0031977 A1 | 2/2012 | Havens et al. |
| 2012/0074226 A1* | 3/2012 | Goren et al. ............. 235/462.21 |
| 2012/0080515 A1 | 4/2012 | van der Merwe |
| 2012/0092531 A1 | 4/2012 | Koziol et al. |
| 2012/0118970 A1 | 5/2012 | Zolotov |
| 2012/0181330 A1* | 7/2012 | Kim ............................. 235/375 |
| 2012/0224083 A1* | 9/2012 | Jovanovski ........ G06K 7/10722 348/231.99 |
| 2012/0312877 A1 | 12/2012 | Zolotov |
| 2013/0048727 A1 | 2/2013 | Liu |
| 2013/0109316 A1 | 5/2013 | Lee |
| 2013/0113967 A1 | 5/2013 | Wang |
| 2013/0155253 A1 | 6/2013 | Wood |
| 2013/0161397 A1 | 6/2013 | Bremer et al. |
| 2013/0194819 A1 | 8/2013 | Gerst et al. |
| 2013/0329115 A1 | 12/2013 | Palmeri |
| 2014/0065948 A1 | 3/2014 | Huang |
| 2014/0097248 A1 | 4/2014 | Smith |
| 2014/0099526 A1 | 4/2014 | Powell et al. |
| 2014/0104451 A1 | 4/2014 | Todeschini et al. |
| 2014/0158769 A1 | 6/2014 | Powell et al. |
| 2014/0171150 A1 | 6/2014 | Hurst et al. |
| 2014/0285913 A1 | 9/2014 | Palmeri |
| 2014/0313377 A1 | 10/2014 | Hampton |
| 2015/0028102 A1 | 1/2015 | Ren et al. |
| 2015/0048166 A1 | 2/2015 | Lei et al. |
| 2015/0048167 A1 | 2/2015 | Russell et al. |
| 2015/0053765 A1 | 2/2015 | Powell et al. |
| 2015/0062366 A1 | 3/2015 | Liu et al. |
| 2015/0199549 A1 | 7/2015 | Lei et al. |
| 2015/0220766 A1 | 8/2015 | Russell et al. |
| 2015/0317503 A1 | 11/2015 | Powell et al. |
| 2015/0356336 A1 | 12/2015 | Hoobler et al. |
| 2016/0077307 A1 | 3/2016 | Palmeri |
| 2016/0092711 A1 | 3/2016 | Powell et al. |
| 2016/0232389 A1 | 8/2016 | Gifford |
| 2018/0352060 A1 | 12/2018 | Gifford et al. |

OTHER PUBLICATIONS

Hand Held Products, Inc., "Dolphin® 7400/7450 Hand Held Computer User's Guide", 2004, 14 pages.

Hand Held Products, Inc., "Dolphin® 7400 Mobile Computer" (datasheet), 7400/SS Rev J, Jul. 2002, 2 pages.

Hand Held Products, Inc., "5000 LED Aimer; 5100 High Visibility LED Aimer; 5300 Laser Aimer; Miniature Image Engines; Optical Subassembly and Licensed Decoder" (datasheet), 5X00-SS Rev B, Dec. 2005, 2 pages.

Hand Held Products, Inc., "5010/5080 LED Aimer; 5110/5180 High Visibility LED Aimer; 5310/5380 Laser Aimer; Decoded Miniature Image Engines" (datasheet), 5X10-80-SS Rev A, Dec. 2005, 2 pages.

Symbol Technologies, Bradley S. Carlson, "2D Barcodes and Imaging Scanner Technology", Lecture Slides Presented at IEEE Long Island Section, Circuits and Systems Society, Apr. 24, 2007 46 pages.

Co-pending U.S. Appl. No. 16/581,091, filed Sep. 24, 2019.

U.S. Appl. No. 15/134,384 Office Action dated Feb. 28, 2017.

U.S. Appl. No. 15/134,384 Office Action dated Sep. 18, 2017.

U.S. Appl. No. 16/581,091 Office Action dated Nov. 4, 2019.

* cited by examiner

ASSISTED AIMER FOR OPTIMIZED SYMBOL SCANNING BY A PORTABLE COMPUTING DEVICE HAVING AN INTEGRAL CAMERA

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 61/603,228, filed Feb. 24, 2012, first named inventor Micheal L. GIFFORD, and entitled ASSISTED AIMER FOR OPTIMIZED SYMBOL SCANNING BY A PORTABLE COMPUTING DEVICE HAVING AN INTEGRAL CAMERA.

BACKGROUND

Field

Advancements in symbol scanning assisted aimer technology and manufacturing are needed to provide improvements in cost, profitability, performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Linear barcodes have been used for many years to mark and to identify manufactured items. Barcode scanners—including hand-held devices—connected to computers running specialized scan software have traditionally been used to count such items, and are able to do so rapidly, without significant error, and are easy to use. These systems, however, are not practical in all work environments because they tend to be expensive, often require use of dedicated hardware and software, and introduce one more machines having a limited, specialized purpose into the workplace. For such applications, better, simpler solutions are being sought.

FIG. 1 illustrates a typical contemporary smart phone 100, which includes a digital camera having a camera lens 102 and a built-in flash, emitting light via a flash aperture 104. The smart phone 100 includes an operating system permitting software responsive to user input to control the digital camera and built-in flash. Specialized software applications are loadable and operable on the phone to use standard operating system interfaces to provide control of the camera and flash. Many tablet computers include a camera, with or without built-in flash.

One low-cost barcode scanner solution has been to adapt the consumer smart phone or tablet to provide barcode imaging and basic item counting (inventory) applications. A number of such barcode reading applications are currently available for popular smart phones and tablets such as those using operating systems by Google, Apple, Microsoft, and others. Many of these applications can also image the rectangular Quick Response barcodes used to link consumers to store locations and to assist in instant price comparisons.

These reader applications do not scan a barcode in the traditional sense. Instead, they use the camera to digitally photograph a printed barcode, analyze the captured barcode image, and convert the analyzed image to an internal representation. The internal representation is then used for some intended purpose, such as displaying the barcode to a user, maintaining a data file, or drive a data processing task such as item counting for inventory management (what, and how many, of each of a plurality of item types are being bought/received/incoming, in stock, or being sold/shipped/outgoing). In practice, the special functionality is limited by the speed with which the camera's autofocus is able to resolve the barcode image. Frequently imaging a single barcode can require anywhere from several seconds to a full minute—operation too slow for inventory use. Rather, these consumer applications are better suited to helping the shopper locate retail outlets and making price comparisons.

Synopsis

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

The inventor recognizes that the challenge, in using a smart phone/tablet camera for item counting/inventor management applications, is two-fold. Most users want to count items rapidly, but the smart phone/tablet per se does not scan a barcode, it takes an electronic photograph of the barcode, analyzes the result, and when finally able to identify the proper item to which the printed barcode pertains, increments a specific count in a list of marked items. (The term "barcode" as used herein refers to both one-dimensional and two-dimensional optical machine-readable geometric patterns representing data.) The process of obtaining a useful image, determining to which item type the image corresponds, and finally incrementing a count for that item type is a less efficient operation than barcode scanning using dedicated application-specific hardware, and thus inherently slower. The second part of the challenge, and first recognized by the inventor, relates to a user's natural tendency to move the camera too close to the printed barcode. This mistake prevents the camera's autofocus feature from operating properly, slowing the process even more. What the user needs to do is to move the camera farther away from the printed barcode, thus allowing autofocus to operate and permitting the identification phase to proceed. The user needs some assistance in aiming the camera at a correct distance from the barcode. Unassisted, the barcode reading can require anywhere from several seconds to as much as a minute per imaged barcode. This speed is impractically too slow for other than occasional inventory taking.

The inventor is the first to recognize that what is needed is some way to help the user point the camera, hold it steady on the printed barcode, and to not crowd forward, preventing autofocus from operating properly. The embodiments presented herein provide aiming assistance for these purposes in the form of an aimer. The aimer uses the smart phone's flash illumination, controlled by a smart phone software application, to provide an aimer beam to assist in properly orienting and distancing the smart phone/tablet camera with respect to a printed barcode. (Alternatively, a separate, external light source is provided for phones having no built-in flash or a flash that is inadequate or otherwise impractical to rely upon for the aimer.) This aimer beam provides the user the assistance needed to (1) hold steady on the desired barcode, and (2) to overcome the tendency to crowd the printed barcode, thus allowing autofocus to properly function, and the software application time to do its job. The aimer is a simple device implementable using a variety of combinations of optical components (such as one or more of a lens, a prism, and/or a light slit) to form the aimer beam (such as by selective bending and/or focusing of the light from the phone's flash). The use of the aimer speeds accurate barcode reading by up to a factor of ten times, thus making possible rapid, accurate, and practical item counting for inventory and other applications. Use of the aimer accordingly dramatically improves the "snappiness" (user perceived quickness and/or efficiency) of barcode reading using a smart phone, reducing frustration and increasing acceptance.

LIST OF REFERENCE SYMBOLS IN DRAWINGS

Figure 1:
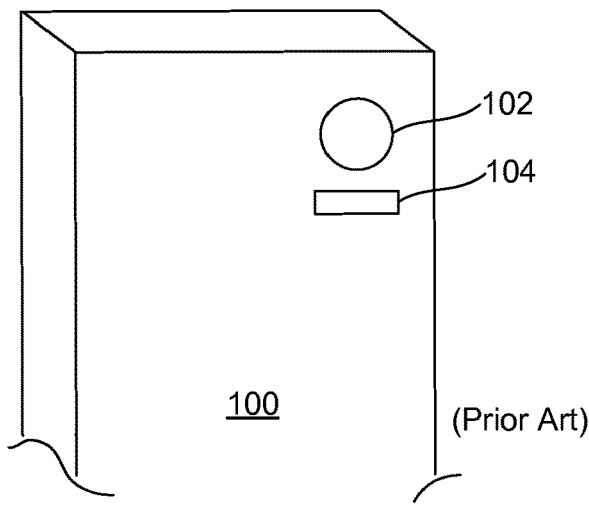
FIG. 1 illustrates a portion of a standard smart phone that will be adaptable to implement an assisted aimer.

| Ref. Symbol | Element Name |
|---|---|
| 100 | Smart Phone |
| 102 | Camera Lens |
| 104 | Flash Aperture |
| 200 | Camera with attached aimer, generally |
| 202 | Phone |
| 204 | Aimer |
| 206 | Attached to phone |
| 208 | Aimer beam |
| 210 | Returned image |
| 300 | Hand-held device with attached aimer |
| 302 | Phone |
| 304 | Attached aimer |
| 306 | Projected aimer beam |
| 308 | Barcode |
| 310 | Aimer beam on target |
| 312 | Returned barcode image |
| 400 | Partial enclosure having integrated aimer, generally |
| 402 | Partial enclosure |
| 404 | Self-aligning receiving space |
| 406 | Integrated aimer |
| 500 | Smart phone inserted into partial enclosure, generally |
| 502 | Partial enclosure |
| 504 | Integrated aimer |
| 506 | Smart phone |
| 600 | Phone and aimer, generally |
| 602 | Smart phone |
| 604 | Clip-attached aimer and external light source |
| 606 | Power and synchronization cable/connector |
| 608 | Smart phone system connector |
| 700 | Phone and enclosure, generally |
| 702 | Partial enclosure |
| 704 | Smart phone |
| 706 | Replaceable battery |
| 708 | Phone system connector |
| 710 | Attached/aligned aimer |
| 800 | Smart Phone with integral aimer, generally |
| 802 | Image Capture Aperture |
| 804 | Flash Aperture |
| 806 | Aimer Aperture |
| 808 | Illumination sub-system |
| 810 | Imaging sub-system |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Figure 2:
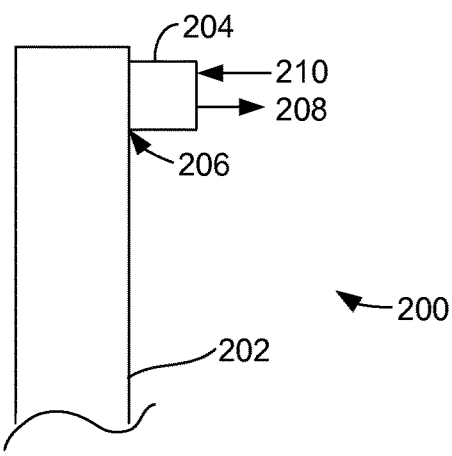
FIG. 2 is a side view of a portion of a hand-held device, such as the smart phone of FIG. 1, illustrating an attached aimer for imaging barcodes such as printed barcodes.

As discussed in greater detail below, an optical apparatus, referred to herein as an aimer, is removably attached (or otherwise coupled in place) to a camera-enabled smart phone/media-player/tablet/other portable/hand-held device 100 at, and in alignment with, the lens/flash aperture openings 102/104, and is illustrated in FIG. 2. (While some assisted aimer embodiments will include wireless and/or Wide Area Network capability, such capabilities are not an essential feature of the assisted aimer.) The system as a whole (smart phone and aimer) is herein called an assisted aimer. The aimer is used to project/draw/"paint" a light beam so as to form an "aiming beam" (or aiming spot/line/site/reticle, or other predetermined geometry), at a predetermined distance from the camera, on a target to be imaged. In various embodiments, the projected geometry includes, but is not limited to, one or more dots, lines, circles, scales, chevrons, more complex shapes, or a combination of these.

The assisted aimer overcomes the camera aiming problem by providing a visual indication of where in space the hand-held device's camera is currently enabled to optimally image a barcode, thereby helping the user point the camera at a barcode, hold the aim steady, and maintain a reasonable distance from the barcode, so that the camera autofocus can operate at its optimum speed. A software application installed on the phone permits the user to control the operation, initiate the aiming beam, take the photograph of the barcode, convert the photograph to a useful internal format, and use the internal format to maintain a data file. In an inventory application, the data file might represent a count of all items whose barcodes have been imaged. With these adjustments in operating procedure, the assisted aimer is able to achieve up to a 10× improvement in speed, making this low cost approach very useful for inventory taking as well as many other hand-held barcode applications.

The projected beam is used to assist a person to correctly aim and distance the camera for imaging the printed barcode, saving time and increasing the speed with which individual barcodes can be imaged. In some embodiments, the beam both assists the user and illuminates the printed barcode. In various embodiments, the beam operates with a predetermined illumination vs. time profile, e.g., at a first intensity for assisting the user to correctly aim and distance the camera and then at a second, greater intensity, synchronized with the camera, during the actual image capture. Alternatively, general diffuse illumination sufficient to provide adequate exposure for imaging the barcode area is provided, supplemented by the concentrated geometrical pattern overlay of the aimer.

In some embodiments the software takes a series of images, compiling information based on each, and does a comparative lookup based on the symbologies supported. In some embodiments, the series is concluded once the software determines that a good read of a valid barcode has been captured. At this juncture the software can provide the user with an audible sound and/or stop the scanner function. A predetermined "good read" (and/or "bad read") audible or visual indication is optionally provided. Configurable timeouts are contemplated, to prevent the user from running down the battery trying to scan a bad or unsupported barcode. In various embodiments, the focus is varied over the series of images, in a predetermined fashion, and/or determined dynamically as a function of the images being taken.

Various configurations of the assisted aimer are contemplated including a complete system of smart phone, software application, and optical apparatus. Also contemplated is a kit for use with a pre-existing camera and including the software application and attachable optical apparatus. For use with phones having cameras but no built-in illumination, the optical apparatus includes its own source of illumination for beam projection, operated by connection with the phone at its system connector.

Other embodiments of the camera enclosures include full and partial enclosures, aimers that clip to the phone so that the aimer covers the built-in flash aperture for forming the aimer beam (in any of a variety of projected geometries, as described previously). In other embodiments the aimer is attachable to the phone using a variety of magnetic, adhesive, and permanent attachment. For embodiments including an external light source, some enclosures include replaceable batteries for powering the light source. In such battery-powered embodiments, the light is synchronized via a cable connection to the phone's system connector. In yet other embodiments, the aimer includes supplemental optics aligned with the phone's camera lens for optimizing the size of the printed barcode image.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system comprising:
    a hand-held device enabled to support general purpose mobile applications and having a built-in digital camera enabled to support general purpose digital photography;
    a light source synchronized with the digital camera;
    a barcode software application for controlling the digital camera and synchronizing the light source to capture an image of a printed barcode, to convert the captured barcode image to an internal form, and to use the internal form for maintaining a data file;

an aimer enabled to project an aiming beam at a predetermined distance; and user controls for initiating beam formation, barcode image capture, image conversion, and file maintenance.

EC2) The system of EC1, wherein the aimer comprises at least one of an arrangement of lenses, prism, and beam forming aperture.

EC3) The system of EC1, wherein the maintained data file comprises an inventory of barcode imaged items and quantities of each, and data file maintenance comprises at least maintaining a correct count of each of the imaged items.

EC4) The system of EC1, wherein the synchronized light source is provided via a flash aperture of a flash built-in to the hand-held device, the barcode software application is executed on the hand-held device, and the user controls are at least in part implemented by the hand-held device.

EC5) The system of EC4, wherein the hand-held device is one of a smart phone or a tablet.

EC6) The system of EC4, wherein the barcode related functionality is a latent feature of the system, the feature is enabled by the presence of the barcode software application and the aimer, and at least one of the barcode software application and the aimer are enabled to be provided as a subsequent field upgrade with respect to an earlier deployment of the system.

EC7) The system of EC4, wherein the aimer is attached to the hand-held device at the flash aperture, and is aligned to enable formation of the aiming beam from light emitted at the flash aperture by the synchronized light source.

EC8) The system of EC7, further comprising the aimer being attached to the hand-held device by one of a magnetic temporary attachment, an adhesive temporary attachment, and a permanent attachment.

EC9) The system of EC4, further comprising enclosure means enabled to receive the aimer as an attachment and further enabled to recieve the hand-held device such that the aimer is aligned to produce the aiming beam from light emitted at the flash aperture by the synchronized light source.

EC10) The system of EC9, wherein the enclosure further comprises one of a partial enclosure of the hand-held device, a full enclosure of the hand-held device, and a clip enclosure for a temporary attachment and alignment of the aimer only.

EC11) The system of EC1, wherein the aimer further comprises means for optimizing a size of a printed barcode image for the camera.

EC12) The system of EC11, wherein the size optimizing means further comprises a lens arrangement, such as a low-magnification telephoto lens, for increasing the size of the barcode image.

EC13) The system of EC11, wherein the hand-held device is flashless, the barcode software application is executed on the hand-held device, and the user controls are at least in part implemented by the hand-held device.

EC14) The system of EC13, wherein the aimer further comprises the synchronized light source and optimized barcode imaging lens, the aimer forms the aimer beam using light emitted by the light source, the aimer is attached to the hand-held device at a camera lens of the built-in digital camera, and the aimer is aligned to enable the optimized barcode imaging lens to optimize a size of the barcode image for the camera EC15) The system of EC14, further comprising the aimer being attached to the hand-held device by one of a magnetic temporary attachment, an adhesive temporary attachment, and a permanent attachment.

EC16) The system of EC14, further comprising the synchronized light source being connected with, and synchronized by, the hand-held device via a cable and connector attached to a mating system interface connector of the hand-held device.

EC17) The system of EC16, wherein the synchronized light source derives operating power via the cable and connector from the hand-held device.

EC18) The system of EC16, further comprising a replaceable battery for providing operating power to the synchronized light source.

EC19) The system of EC14, further comprising enclosure means enabled to receive the aimer as an attachment and further enabled to receive the hand-held device such that the camera lens is aligned to optimize barcode image size.

EC20) The system of EC19, wherein the enclosure further comprises one of a partial enclosure of the hand-held device, a full enclosure of the hand-held device, and a clip enclosure for a temporary attachment and alignment of the aimer only.

EC21) An aimer kit for use with a hand-held device such as a smart-phone, the hand-held device having a camera with flash, the kit comrpising:

an aimer adapted for attachment to the hand-held device at camera lens and flash apertures for optimizing a camera image and for forming a beam at a predetermined distance using light emitted by the flash; and a software application for use on the hand-held device, the application being responsive to user input for using the camera, flash, and aimer to form the aiming beam, to capture an image of a printed barcode, to convert the barcode to an internal format, and to use the internal format for maintaining a data file.

EC22) The aimer kit of EC21, further comprising the aimer being adapted for attachment to the hand-held device and aligned with a camera lens and a flash aperture.

EC23) The aimer kit of EC22, further comprising the aimer being attached to the hand-held device by one of a magnetic temporary attachment, an adhesive temporary attachment, and a permanent attachment.

EC24) The aimer kit of EC22, further comprising enclosure means with attached aimer for receiving the hand-held device such that the camera lens and flash aperture are aligned to optimize barcode image size and to produce the aiming beam.

EC25) The aimer kit of EC24, wherein the enclosure further comprises one of a partial enclosure of the hand-held device, a full enclosure of the hand-held device, and a clip enclosure for a temporary attachment and alignment of the aimer only.

EC26) An aimer kit for use with a hand-held device such as a smart-phone or tablet, the hand-held device having a camera without flash, the kit comprising:

an aimer including a synchronized light source, and adapted for attachment to the hand-held device at camera lens for optimizing a camera image and for forming an aiming beam at a predetermined distance using light emitted by the synchronized light source; and a software application for use on the hand-held device, the application being responsive to user input for using the camera and synchronized light source to form the aiming beam, to capture an image of a printed barcode, to convert the image to an internal format, and to use the internal format for maintaining a data file.

EC27) The aimer kit of EC26, further comprising the aimer being adapted for attachment to the hand-held device, aligned with a camera lens, and producing the aiming beam.

EC28) The aimer kit of EC27, further comprising the aimer being attached to the hand-held device by one of a magnetic temporary attachment, an adhesive temporary attachment, and a permanent attachment.

EC29) The aimer kit of EC27, further comprising enclosure means with attached aimer for receiving the hand-held device such that the camera lens is aligned to optimize barcode image size and to produce the aiming beam.

EC30) The aimer kit of EC29, wherein the enclosure further comprises one of a partial enclosure of the hand-held device, a full enclosure of the hand-held device, and a clip enclosure for a temporary attachment and alignment of the aimer only.

EC31) The aimer kit of EC29, further comprising the synchronized light source being connected with, and synchronized by, the hand-held device via a cable and connector attached to a mating system interface connector of the hand-held device.

EC32) The aimer kit of EC29, wherein the synchronized light source derives operating power via the cable and connector from the hand-held device.

EC33) The aimer kit of EC29, further comprising a replaceable battery for providing operating power to the synchronized light source.

EC34) The system of EC1, wherein the beam is a horizontal beam.

EC35) The system of EC1, wherein the beam is formed at a predetermined distance.

EC36) The system of EC1, wherein the beam forming aperture is a beam forming slit.

Assisted Aimer—Sleeveless Embodiments

FIG. 2 is a side view of a hand-held device, such as the smart phone of FIG. 1, illustrating an attached aimer for imaging printed barcodes such as barcodes. The phone and attached aimer are indicated generally by the reference numeral 200 and illustrated aspects of this embodiment include a phone 202, an aimer 204 (an optical apparatus for generating an aiming beam), attachment 206 to phone, a flash-derived aimer beam 208, and image 210 returned to camera lens. While illustrated using a smart phone, it is contemplated that the techniques herein are equally applicable to other portable computing devices having integrated camera functionality (including, but not limited to laptops and tablets).

According to embodiment, aimer beam formation is achieved in several ways including use of one or more focusing lens, mirror, light slit, prism, diffuser, or a combination of these. E.g., an aiming spot at the center of a target can be generated by a single LED on-axis with a single focusing lens (or mirror). Diffusers can also be used with LEDs to form soft-focus patterns. Light from the phone's flash passes through the attached aimer, which can be aligned/rotated relative to the flash aperture, to orient the resulting beam emerging from the aimer as desired. Various techniques are contemplated for attachment of the aimer directly to the phone, including slip-on, clip-on, snap-on, glue-on, and magnetic attachment, among others.

In some embodiments, the optics comprised in aimer 204 include not only optics for forming the aimer beam, but also optics for altering the image recorded by the camera. E.g., aimer 204 may also include optics for optimizing the captured barcode images. In such embodiments, the aimer is aligned with the flash while the optimizing optics are aligned with the camera. In some embodiments, the aimer may be field configurable with or without particular optics (according to embodiment including, but not limited to, "macro lens", or telephoto, functionality) in the imaging path.

Figure 3:
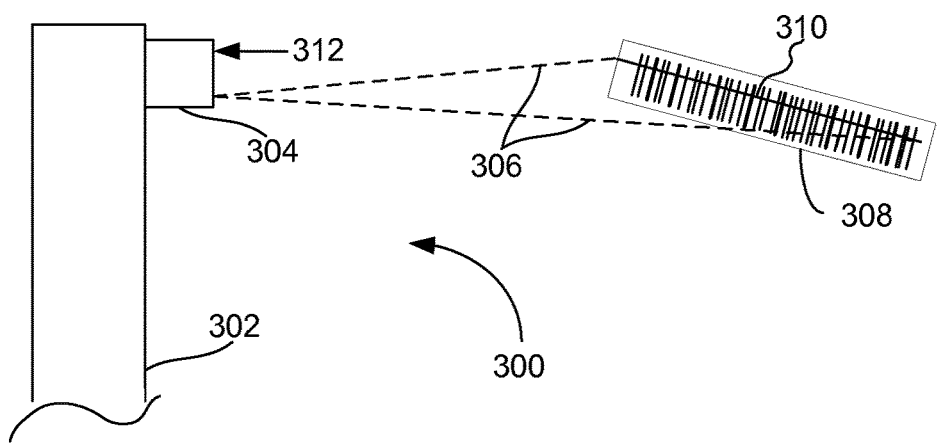
FIG. 3 is a pictorial view illustrating a portion of the hand-held device with attached aimer of FIG. 2 projecting an aimer beam onto a target barcode and a barcode image returned to a camera lens.

FIG. 3 is a pictorial view illustrating the hand-held device with attached aimer of FIG. 2 projecting an aimer beam onto a target barcode and a barcode image returned to a camera lens. These details are indicated generally by reference numeral 300 and include a phone 302 with an attached aimer 304, an aimer beam 306 (projecting outward from the aimer in a manner not necessarily noticeable to the user while "in flight", illustrated here using dashed lines), a target barcode 308, the aimer beam 310 projected noticeably on the target barcode, and a returned barcode image 312.

Light emitted by built-in flash on phone 302 passes through attached aimer 304 and emerges as projected aimer beam 306 (dashed lines). In this illustrative embodiment, the projected beam intersects with barcode 308 as a horizontal line 310 extending from one end of barcode 308 to the other end. The barcode image 312 is returned to the camera lens and is digitally imaged by camera 302 under control of the specialized software application. Having the length of the horizontal line 310 approximate the horizontal length of the barcode 308 helps the user point the camera 302 directly at the barcode. If the user allows the beam to drift up, down, or to one side or the other, he is able to correct his aim so that the camera can acquire the barcode. Having the length of the horizontal line 310 approximate the horizontal length of the barcode when the camera is held at an approximate optimum distance from the barcode also helps the user hold the camera at the approximate optimum distance from the barcode, e.g., 1-2 feet, permitting the camera autofocus to operate at its optimum speed. If he holds the camera too close to the barcode, the length of the line 310 will not extend to the ends of the barcode 308. If he holds the camera too far from the barcode, the length of the line 310 will extend beyond the ends of the barcode.

While FIG. 3 shows an aimer beam enabled to project a horizontal line, other projection geometries (light beam patterns) are contemplated. These projection geometries may include one or more dots/spots, circles, concentric circles, lines, chevrons, rectangles, other polygons, combinations of the foregoing (such as various "crosshairs"), and segmented/dashed/dotted versions of these (e.g., square corners). The degree to which these geometries are focused (from sharp focus to diffuse) will vary by embodiment. As with the use of a horizontal aimer beam described previously, in some embodiments the horizontal extent of the projection geometries are enabled to generally match the horizontal length of the barcode when the camera is held at an approximate optimum distance.

In some embodiments, the aimer is not directly attached to the phone. Instead, the phone is inserted into a self-aligning receiving space of a partial enclosure and the aimer is attached to the partial enclosure. Once inserted, the camera lens (102 of FIG. 1) and flash aperture (104 of FIG. 1) are maintained in a proper alignment with the attached aimer for producing the aimer beam during use (in any of a variety of projected geometries, as described previously). Several representative enclosures incorporating an aimer are illustrated in FIGS. 4-7.

Assisted Aimer—Sleeve Embodiments

Figure 4:
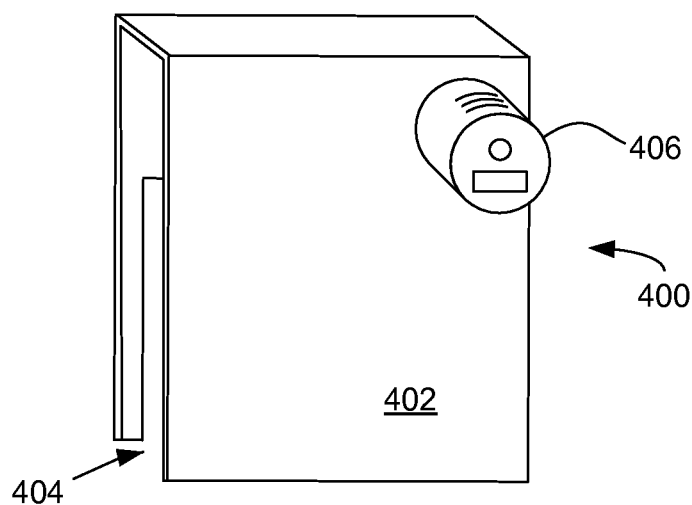
FIG. 4 is a pictorial view of a partial enclosure creating a self-aligning receiving space for a hand-held device, the partial enclosure including an optical aimer located to align with a camera lens and flash aperture of a compatible device such as the smart phone of FIG. 1.

FIG. 4 is a pictorial view of a partial enclosure creating a self-aligning receiving space for a hand-held device, the partial enclosure including an optical aimer located to align with a camera lens and flash aperture of a compatible hand-held device such as the smart phone of FIG. 1. The partial enclosure is indicated generally by the reference numeral 400 and includes partial enclosure 402, self-aligning receiving space 404, and integrated aimer 406.

Partial enclosure 402 creates a space 404 for receiving an upper end of a smart phone, such as smart phone 100, illustrated in FIG. 1. Camera lens 102 and flash aperture 104 of smart phone 100 are located in an upper corner of the side normally facing away from a user. Attached aimer 406 is placed in a corresponding upper corner of partial enclosure 402, which is open at its bottom side for receiving an upper half of the smart phone 100. When a phone is fully inserted into the self-aligning receiving space 404, the phone's camera lens 102 and flash aperture 104 are aligned with the aimer, permitting the aimer to receive light emitted from flash aperture 104, form the received light into an aimer beam and bring the beam to a focus at a predetermined distance, typically 1-2 feet. These details are illustrated in FIG. 5.

Figure 5:
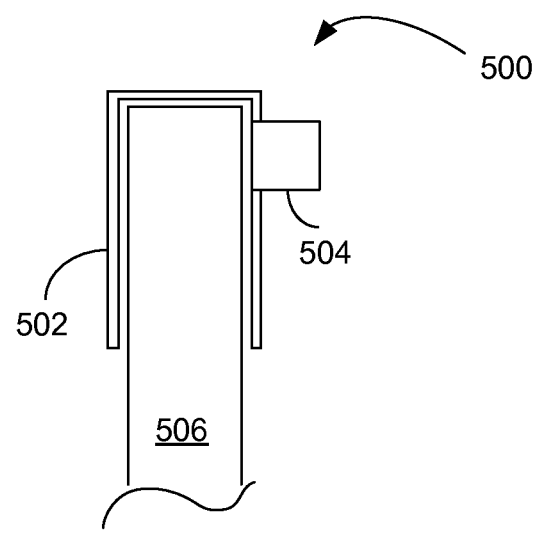
FIG. 5 is a side view of a portion of a smart phone inserted into the receiving space of the partial enclosure of FIG. 4.

FIG. 5 is a side view of a smart phone inserted into the self-aligning receiving space 404 of the partial enclosure of FIG. 4. The details are indicated generally by reference numeral 500 and include partial enclosure 502 having an integrated aimer 504, and smart phone 506 inserted through the open bottom into the self-aligning receiving space (404 of FIG. 4). When the phone is fully inserted, the phone's camera lens and flash aperture are properly aligned with the optical elements of integrated aimer 504. The word "integrated" signifying that the aimer and partial enclosure 502 can be manipulated as a combined unit. In some embodiments the integrated aimer 504 is permanently attached to partial enclosure 502, in other embodiments it is removably attached to same.

Figure 6:
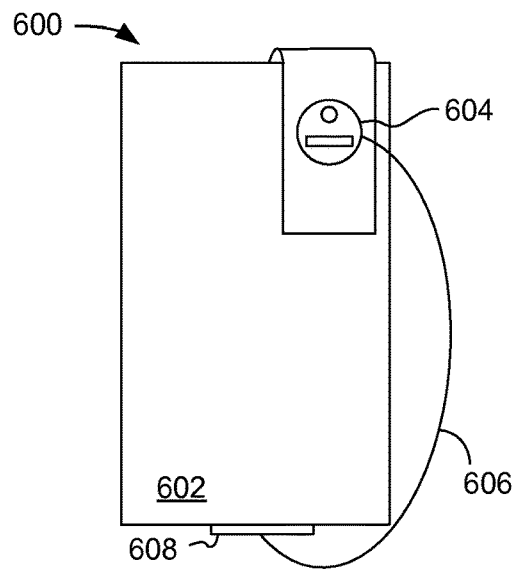
FIG. 6 is a front view illustrating an aimer that includes its own light source for use with a smart phone having a camera but no flash, the light source deriving operating power and synchronization control via a cable and mating connector attached to a system connector at the base of the phone, and the aimer including a clip mount for attachment to the smart phone.
Figure 7:
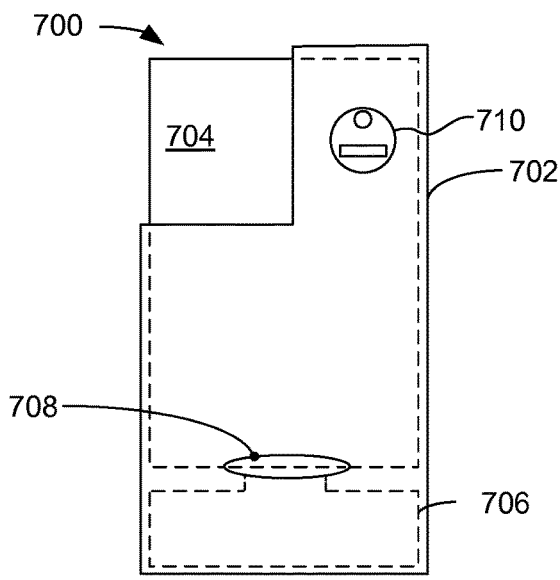
FIG. 7 illustrates another configuration of a partial enclosure defining a self-aligning receiving space for a hand-held device in which the enclosure includes a replaceable battery and an attached aimer that includes its own light source.

When a hand-held device, such as a smart phone, has a digital camera but does not include built-in flash, or for various reasons it is determined to either not rely on or to augment a built-in flash, an external light source, synchronized and controllable by the smart phone software application can be provided. FIGS. 6 and 7 illustrate aimers that provide such light sources.

According to embodiment, aimer components include combinations of one or more focusing lens, mirror, light slit, prism, diffuser, LED, laser diode, electromechanical drive (for oscillating one or more components, such as a lens or mirror), and Diffractive Optical Element (DOE). E.g., a lens with two off-axis LEDs can be used to generate spots on respective ends of a target. A single LED used with an oscillating lens can create an aiming line. DOEs or diffusers can be used with laser diodes to form focused patterns in arbitrary shapes. So long as consistent with implementation via a sleeve, sleeved embodiments may also implement any of the other features discussed in the various sleeveless embodiments.

FIG. 6 is a front view illustrating an aimer that includes its own light source for use with a smart phone (such as one having a camera but no flash), the light source deriving operating power and synchronization control via a cable and mating connector attached to a system connector at the base of the phone, and the aimer including a clip mount for attachment to the smart phone.

The phone and aimer are indicated generally by reference numeral 600 and include a smart phone 602, a clip-attached external combination aimer and light source 604, a power and synchronization cable 606, connecting the external light source to smart phone system connector 608. Details of the connection to a specific model of a smart phone will depend upon the phone's manufacturer. The connection illustrated is typical of connection via a system connector of the Apple iPhone series of smart phones, enabling the smart phone to charge and transfer data (such as for updates).

During use, aimer/light source 604 is clipped onto smart phone 602 such that the phone camera lens is aligned with any image-enhancement optics made part of the aimer, and such that the aimer beam is aligned to coincide with the long axis of barcodes to be scanned, typically in a horizontal direction. The external light source in the aimer derives operating power from the smart phone battery via connector 608. A software application installed and operable on the smart phone controls the external light via a programming interface, and according to embodiment provides user controls via the phone's user interfaces, such as by (re-)programming the function of physical controls (such as physical buttons), or by implementing virtual controls (such as buttons, sliders, knobs, or data entry fields) on a touchscreen of the phone, the virtual controls being implemented via one or more screens and/or menus). Smartphone operating systems generally comprise one or more Application Programming Interfaces (APIs) for separate programmatic control of the flash and camera. Via these API, the assisted aimer software is able to provide a wide range of functionality, according to embodiment, including basic synchronization of the flash with camera image capture, and implementation of illumination vs. time profiles as discussed elsewhere herein.

In a typical application, the software application (e.g., as supplied and/or stored on a tangible or non-transitory computer medium, such as software stored on optical, magnetic, or solid-state media), aimer 604, including cable 606 and mating connector for connection via phone system connector 608, are sold as a kit for use with smart phone 602. In specific embodiments, external electrical circuits required for use by a particular smart phone model are incorporated into aimer 604. In other specific embodiments, attachment and alignment of aimer 604 to phone 602 is achieved as part of a partial enclosure, such as that illustrated in FIGS. 4, 5, or by means of magnetic, temporary adhesive, or permanent gluing as discussed with respect to FIG. 2. Other means of attachment/alignment are also contemplated.

FIG. 7 illustrates another configuration of a partial enclosure defining a receiving space for a hand-held device in which the enclosure includes a replaceable battery and an attached aimer that includes its own light source. Phone and enclosure details are indicated generally by reference numeral 700 and include partial enclosure 702, enclosing smart phone 704, and providing a replaceable battery 706 supplying supplemental operating power to phone via phone system connector 708 (having functionality as described previously for system connector 608 of FIG. 6), and to attached/aligned aimer 710 including aimer beam forming optical elements and optional image-enhancement optical elements (not separately illustrated). According to embodiment, the aimer beam is formed in any of a variety of projected geometries, as described previously. Attached/aligned aimer 710 derives operating power from replaceable battery 706, and obtains synchronization with phone camera via the phone system connector 708. In some embodiments, the replaceable battery 706 provides supplemental operating power to smart phone 704, at least during "scanning" (barcode imaging and processing). In some embodiments, the replaceable battery 706 is provided by a combination of standard, commercially available, off-the-shelf batteries.

Figure 8:
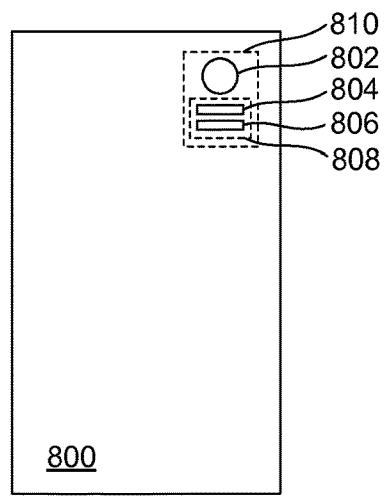
FIG. 8 is a front view of a hand-held device incorporating an integral aimer for imaging barcodes such as printed barcodes.

FIG. 8 is a front view of a hand-held device, incorporating an integral aimer for imaging printed barcodes such as barcodes, and otherwise having the features associated with a smart phone (or tablet). Illustrated aspects of this embodiment include smart phone 800, modular imaging sub-system 810, modular illumination sub-system 808, image capture aperture 802, flash aperture 804, and aimer aperture 806. According to embodiment, imaging sub-system 810 is a build-option module or a standard component of smart phone 800. Imaging sub-system 810 comprises an image capture sub-system, of which image capture aperture 802 is the principal user-visible component. According to embodiment, image capture aperture 802 comprises a conventional camera lens assembly for digital photography and/or further optical components (as discussed previously) supporting enhanced imaging for barcodes. According to embodiment, illumination sub-system 808 is a build-option module or a standard component of imaging sub-system 810. According to embodiment, illumination sub-system 808 comprises flash aperture 804 and/or aimer aperture 806. According to embodiment, aimer aperture 806 comprises a conventional illumination source for digital photography and/or further optical components (as discussed previously) enabling projection of an aiming beam (implementing any of the varieties of aiming beam geometries discussed previously). Opening or "giving focus" to a digital photography application configures and uses the various described components of the imaging sub-system 810 in a manner optimal for digital photography. Opening or giving focus to a barcode "scanning" application configures and uses the various described components of the imaging sub-system 810 in a manner optimal for imaging barcodes, as discussed throughout.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
    a smart phone enabled to support general purpose mobile applications and having a built-in digital camera enabled to support general purpose digital photography, the camera comprising an autofocus feature and a flash having a flash aperture, and wherein the smart phone is a standard smart phone not having any barcode imaging application-specific hardware;
    a barcode software application for controlling the camera and the flash to capture an image of a printed barcode, to convert the captured barcode image to an internal form, and to use the internal form for maintaining a data file;

an aimer attachable to the smart phone as a field upgrade and configured to cover the flash aperture when attached to the smart phone, such that the aimer, when covering the flash aperture, is aligned to collect light emitted at the flash aperture and to focus an aiming beam formed from the collected light at a predetermined distance from the camera, the aimer further enabled to form the aiming beam to have a predetermined extent along a dimension, the predetermined extent approximately matching an extent of the barcode along the dimension when the smart phone is held at the predetermined distance from the barcode, and wherein the predetermined distance approximately corresponds to an optimum distance for operation of the camera autofocus; and user controls, at least in part implemented by execution of the barcode software application on the smart phone, for initiating beam formation, barcode image capture, image conversion, and file maintenance; and wherein the aimer is enabled to assist a user in distancing the smart phone from the barcode so as to enable the camera autofocus to resolve the barcode image with optimum speed and thereby more rapidly process the barcode than possible with the smart phone alone.

2. The system of claim 1, wherein the aimer comprises at least one of an arrangement of lenses, a prism, and a beam forming aperture.

3. The system of claim 1, wherein the maintained data file comprises an inventory of barcode imaged items and quantities of each, and the file maintenance comprises at least maintaining a correct count of each of the imaged items.

4. The system of claim 1, wherein the aimer is attached to the smart phone at the flash aperture.

5. The system of claim 4, further comprising the aimer being attached to the smart phone by one of a magnetic temporary attachment, an adhesive temporary attachment, and a permanent attachment.

6. The system of claim 1, further comprising an enclosure enabled to receive the aimer as an attachment and further enabled to receive the smart phone.

7. The system of claim 6, wherein the enclosure further comprises one of a partial enclosure of the smart phone, a full enclosure of the smart phone, and a clip enclosure for a temporary attachment and alignment of the aimer only.

8. The system of claim 1, wherein the aimer further comprises means for optimizing a size of a printed barcode image for the camera.

9. The system of claim 8, wherein the size optimizing means further comprises a low-magnification telephoto lens for increasing the size of the barcode image.

10. A system comprising:
a tablet enabled to support general purpose mobile applications and having a built-in digital camera comprising an autofocus feature, a flash having a flash aperture, and a lens and enabled to support general purpose digital photography, and wherein the tablet is a standard tablet not having any barcode imaging application-specific hardware;

an aimer comprising barcode image optimizing optics attachable in alignment with the camera lens to enable the barcode image optimizing optics to optimize barcode image size for the camera, the aimer configured to cover the flash aperture when attached to the tablet, such that the aimer, when covering the flash aperture, is aligned to collect light emitted at the flash aperture and to selectively focus an aiming beam at a predetermined distance from the digital camera and to have a predetermined extent along a dimension, the predetermined extent approximately matching an extent of a printed barcode along the dimension when the tablet is held at the predetermined distance from the barcode, and wherein the predetermined distance approximately corresponds to an optimum distance for operation of the camera autofocus;

a barcode software application for controlling the digital camera and the light source to capture an optimized image of the barcode, to convert the captured optimized barcode image to an internal form, and to use the internal form for maintaining a data file; and user controls, at least in part implemented by execution of the barcode software application on the tablet, for initiating beam formation, barcode image capture, image conversion, and file maintenance; and wherein the aimer is enabled to assist a user in distancing the tablet from the barcode so as to enable the camera autofocus to resolve the captured optimized barcode image with optimum speed and thereby more rapidly process the barcode than possible with the tablet alone.

11. The system of claim 10, wherein the barcode image optimizing optics comprises a magnifying lens and the optimized barcode image comprises an increased image size relative to that obtained with the tablet alone.

12. The system of claim 10, further comprising the aimer being attached to the tablet by one of a magnetic temporary attachment, an adhesive temporary attachment, and a permanent attachment.

13. The system of claim 11, further comprising an enclosure enabled to receive the aimer as an attachment and further enabled to receive the tablet such that the camera lens is aligned to optimize barcode image size.

14. The system of claim 13, wherein the enclosure further comprises one of a partial enclosure of the tablet, a full enclosure of the tablet, and a clip enclosure for a temporary attachment and alignment of the aimer only.

15. The system of claim 1, wherein the aiming beam is sharply focused.

16. The system of claim 10, wherein the aiming beam is sharply focused.

17. The system of claim 1, wherein the operation of the aimer is synchronized with operation of the flash.

18. The system of claim 1, wherein the barcode software application is configured to capture a series of the barcode images per use.

19. The system of claim 18, wherein a focus of the barcode images is varied over the series of images.

20. The system of claim 18, wherein the series of images is concluded when the barcode software application determines that an adequate read of the barcode has been captured.

* * * * *